US012600357B2

(12) United States Patent (10) Patent No.: US 12,600,357 B2
Wilhelmsson et al. (45) Date of Patent: Apr. 14, 2026

(54) COMPUTER SYSTEM AND METHOD FOR CONTROLLING A VEHICLE

(71) Applicant: Volvo Truck Corporation, Gothenburg (SE)

(72) Inventors: Martin Wilhelmsson, Torslanda (SE); Oscar Stjernberg, Gothenburg (SE); Anders Eriksson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/205,014

(22) Filed: May 12, 2025

(65) Prior Publication Data

US 2025/0360924 A1 Nov. 27, 2025

(30) Foreign Application Priority Data

May 24, 2024 (EP) ..................................... 24177861

(51) Int. Cl.
*F01N 9/00* (2006.01)
*B60W 10/02* (2006.01)
(Continued)

(52) U.S. Cl.
CPC ...... *B60W 30/18009* (2013.01); *B60W 10/02* (2013.01); *B60W 10/06* (2013.01);
(Continued)

(58) Field of Classification Search
CPC .......... B60W 30/18009; B60W 10/02; B60W 10/06; B60W 10/10; B60W 10/184;
(Continued)

(56) References Cited

U.S. PATENT DOCUMENTS

| | | |
|---|---|---|
| 11,187,178 B1 | 11/2021 | Bieniek et al. |
| 2010/0043404 A1 | 2/2010 | Hebbale et al. |
| (Continued) | | |

FOREIGN PATENT DOCUMENTS

| | | |
|---|---|---|
| DE | 102021130004 A1 | 5/2022 |
| EP | 3611362 A2 | 2/2020 |
| EP | 3611362 A3 | 7/2020 |

OTHER PUBLICATIONS

Extended European Search Report for European Patent Application No. 24177861.2, mailed Nov. 14, 2024, 11 pages.

*Primary Examiner* — Tisha D Lewis

(74) *Attorney, Agent, or Firm* — Withrow & Terranova, PLLC

(57) ABSTRACT

A computer system including processing circuitry configured to control a vehicle, the processing circuitry being configured to: determine that an expected travelling route of the vehicle includes a downhill road segment followed by an uphill road segment; predict an engine exhaust condition of an engine of the vehicle, wherein the engine exhaust condition is expected to apply while driving the vehicle along the uphill road segment; determine a target temperature criterion for an exhaust aftertreatment system of the vehicle based on the predicted engine exhaust condition; and control the vehicle during the downhill road segment such that a temperature of the exhaust aftertreatment system meets the target temperature criterion at a beginning of the uphill road segment.

19 Claims, 4 Drawing Sheets

(51) Int. Cl.

| | |
|---|---|
| *B60W 10/06* | (2006.01) |
| *B60W 10/10* | (2012.01) |
| *B60W 10/184* | (2012.01) |
| *B60W 30/18* | (2012.01) |
| *B60W 50/00* | (2006.01) |

(52) U.S. Cl.
CPC .......... *B60W 10/10* (2013.01); *B60W 10/184* (2013.01); *B60W 50/0097* (2013.01); *F01N 9/005* (2013.01); *B60W 2510/0676* (2013.01); *B60W 2510/068* (2013.01); *B60W 2530/10* (2013.01); *B60W 2530/16* (2013.01); *B60W 2552/15* (2020.02); *B60W 2555/20* (2020.02); *B60W 2556/10* (2020.02); *B60W 2556/40* (2020.02); *B60W 2710/021* (2013.01); *B60W 2710/0677* (2013.01); *B60W 2710/1005* (2013.01); *B60W 2710/18* (2013.01)

(58) Field of Classification Search
CPC ..... B60W 50/0097; B60W 2510/0676; B60W 2510/068; B60W 2530/10; B60W 2530/16; B60W 2552/15; B60W 2555/20; B60W 2556/10; B60W 2556/40; B60W 2710/021; B60W 2710/0677; B60W 2710/1005; B60W 2710/18; F01N 9/005
See application file for complete search history.

(56) References Cited

U.S. PATENT DOCUMENTS

| | | |
|---|---|---|
| 2016/0040616 A1 | 2/2016 | Dickson et al. |
| 2020/0031332 A1* | 1/2020 | Koti ..................... B60W 10/06 |
| 2024/0133329 A1 | 4/2024 | Dahl et al. |

* cited by examiner

COMPUTER SYSTEM AND METHOD FOR CONTROLLING A VEHICLE

PRIORITY APPLICATIONS

The present application claims priority to European Patent Application No. 24177861.2, filed on May 24, 2024, and entitled "COMPUTER SYSTEM AND METHOD FOR CONTROLLING A VEHICLE," which is incorporated herein by reference in its entirety.

TECHNICAL FIELD

The disclosure relates generally to vehicle control. In particular aspects, the disclosure relates to a computer system and a method for controlling a vehicle to achieve a desired temperature of an exhaust aftertreatment system of the vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In a vehicle driven by an internal combustion engine, in particular a diesel engine, an exhaust aftertreatment system (EATS) including a selective catalytic reduction (SCR) unit is provided for reducing emissions of, e.g., nitrogen oxides (NOx). To maintain NOx emissions at an acceptable level, a temperature of the EATS must be kept within optimal boundaries at all times during operation of the vehicle. If the EATS temperature is too low or too high, the SCR catalyst is not able to convert the NOx optimally. In hilly terrain, and in particular during uphill climbs, it may be difficult to keep the temperature of the EATS within the optimal boundaries without negatively affecting fuel consumption. Cooling systems may be used for cooling the EATS during uphill climbs, but such systems increase the fuel consumption and it is therefore desirable to find other ways to control the temperature of the EATS.

SUMMARY

According to a first aspect of the disclosure, a computer system comprising processing circuitry configured to control a vehicle is provided. The processing circuitry is configured to:

determine that an expected travelling route of the vehicle comprises a downhill road segment followed by an uphill road segment, predict an engine exhaust condition of an engine of the vehicle, wherein the engine exhaust condition is expected to apply while driving the vehicle along the uphill road segment, determine a target temperature criterion for an exhaust aftertreatment system of the vehicle based on the predicted engine exhaust condition, control the vehicle during the downhill road segment such that a temperature of the exhaust aftertreatment system meets the target temperature criterion at a beginning of the uphill road segment.

The first aspect of the disclosure may seek to provide an in at least some aspect improved computer system for controlling a vehicle in connection with driving in hilly terrain, in particular along a travelling route comprising a downhill road segment followed by an uphill road segment.

A technical benefit may include an improved ability to keep the EATS within desired temperature boundaries during the uphill road segment, such that, e.g., NOx emissions can be better controlled without negatively affecting fuel consumption during the climb. This may entail a reduced need to use cooling systems and other strategies for reducing the temperature of the EATS during the actual climb. By predicting the engine exhaust condition that will apply during the uphill climb, and based thereon determine a suitable temperature that the EATS should have when entering the climb, situations in which the temperature of the EATS increases above an upper temperature level for efficient NOx reduction may be avoided.

The target temperature criterion may be considered met if the exhaust gas temperature, as measured within the EATS, is at a target temperature value or within a target temperature range at the beginning of the uphill road segment. The target temperature criterion may be set by taking an expected temperature increase during the uphill climb into account, as well as the upper temperature level for efficient NOx reduction within an SCR unit of the EATS.

Optionally in some examples, including in at least one preferred example, the engine exhaust condition comprises an engine out temperature and an exhaust mass flow of exhaust gases from the engine. The expected engine out temperature and the expected exhaust mass flow during the uphill climb are important factors for determining an expected temperature increase of the EATS during the uphill climb.

Optionally in some examples, including in at least one preferred example, the processing circuitry is configured to predict the engine exhaust condition based on a length and an inclination of the uphill road segment, and further based on a set of vehicle parameters including at least a current vehicle weight and an expected vehicle speed of the vehicle along the uphill road segment. A technical benefit may include an ability to predict the temperature increase along the uphill road segment with sufficient accuracy. The current vehicle weight, the expected vehicle speed, and the length and inclination of the uphill road segment will all affect the temperature of the EATS during the climb, wherein the temperature will generally increase with increasing vehicle weight, vehicle speed, length, and inclination. Of course, the vehicle speed as well as the inclination may vary along the uphill road segment, for example, the vehicle speed will likely decrease as the vehicle drives along the uphill road segment. The "expected vehicle speed" may hence be understood as an expected speed profile along the uphill road segment rather than a fixed speed value, and the "inclination of the uphill road segment" may be understood as a topographic profile of the uphill road segment.

Optionally in some examples, including in at least one preferred example, the processing circuitry is configured to predict the expected vehicle speed of the vehicle along the uphill road segment based on input data received from a cruise control of the vehicle.

Optionally in some examples, including in at least one preferred example, the processing circuitry is configured to monitor the vehicle weight to determine the current vehicle weight.

Optionally in some examples, including in at least one preferred example, the set of vehicle parameters used by the processing circuitry to predict the engine exhaust condition further includes one or more of: a time constant of the exhaust aftertreatment system, an ambient temperature of the vehicle at a current vehicle location, a roll resistance felt by the vehicle, and/or an air resistance felt by the vehicle. A technical benefit of including one or more of these parameters may be an increased accuracy in the prediction of the engine exhaust condition.

Optionally in some examples, including in at least one preferred example, the processing circuitry is configured to determine the length and the inclination of the uphill road segment by:

predicting a road topography along the expected travelling route of the vehicle based on a geographic position of the vehicle and map data and/or historical data and/or statistical data.

A technical benefit may include the ability to accurately predict the length and inclination based on available data.

Optionally in some examples, including in at least one preferred example, the processing circuitry is configured to determine the target temperature criterion such that a predicted engine out temperature does not exceed a predetermined threshold value throughout the uphill road segment. A technical benefit may include an improved possibility to maintain the temperature of the EATS below an upper temperature level for efficient NOx reduction during the uphill road segment.

Optionally in some examples, including in at least one preferred example, the control of the vehicle during the downhill road segment comprises control of one or more of an engine power, an engine coupling to a driveline of the vehicle, a gear selection, an exhaust system of the vehicle, an engine braking system, and a service brake. A technical benefit may include efficient and versatile reduction of the EATS temperature during the downhill road segment, preparing for the uphill road segment.

Optionally in some examples, including in at least one preferred example, the processing circuitry is configured to monitor a temperature of the exhaust aftertreatment system during the downhill road segment, and to control the engine to be turned off and decoupled from a driveline of the vehicle in response to detecting that the target temperature criterion is met. The temperature of the EATS may hence, in most cases, be expected to remain the same as when the engine was turned off during the rest of the downhill road segment. Once the beginning of the uphill road segment is reached, the engine may be turned on again. A technical benefit may include reduced fuel consumption and a reduction of emissions from the vehicle.

According to a second aspect of the disclosure, a vehicle comprising the computer system of the first aspect is provided. The second aspect of the disclosure may seek to provide an in at least some aspect improved vehicle. A technical benefit may include a vehicle offering an improved EATS temperature control and consequently an improved emission control in hilly terrain.

Optionally in some examples, including in at least one preferred example, the vehicle is a heavy-duty vehicle such as a truck or a bus.

According to a third aspect of the disclosure, a computer-implemented method for controlling a vehicle is provided, the method comprising:

determining, by processing circuitry of a computer system, that an expected travelling route of a vehicle comprises a downhill road segment followed by an uphill road segment, predicting, by the processing circuitry, an engine exhaust condition of an engine of the vehicle, wherein the engine exhaust condition is expected to apply while driving the vehicle along the uphill road segment, determining, by the processing circuitry, a target temperature criterion for an exhaust aftertreatment system of the vehicle based on the predicted engine exhaust condition, controlling, by the processing circuitry, the vehicle during the downhill road segment such that a temperature of the exhaust aftertreatment system meets the target temperature criterion at a beginning of the uphill road segment.

The method according to the third aspect is associated with advantages and technical benefits corresponding to those of the computer program according to the first aspect.

Optionally in some examples, including in at least one preferred example, the engine exhaust condition comprises an engine out temperature and an exhaust mass flow of exhaust gases from the engine.

Optionally in some examples, including in at least one preferred example, the prediction of the engine exhaust condition is performed based on a length and an inclination of the uphill road segment, and further based on a set of vehicle parameters including at least a current vehicle weight and an expected vehicle speed of the vehicle along the uphill road segment.

Optionally in some examples, including in at least one preferred example, the method further comprises:

predicting, by the processing circuitry, the expected vehicle speed of the vehicle along the uphill road segment based on input data received from a cruise control of the vehicle, and/or monitoring, by the processing circuitry, the vehicle weight to determine the current vehicle weight.

Optionally in some examples, including in at least one preferred example, the set of vehicle parameters used in the prediction of the engine exhaust condition further includes one or more of: a time constant of the exhaust aftertreatment system, an ambient temperature of the vehicle at a current vehicle location, a roll resistance felt by the vehicle, and/or an air resistance felt by the vehicle.

Optionally in some examples, including in at least one preferred example, the determination of the length and the inclination of the uphill road segment comprises:

predicting a road topography along the expected travelling route of the vehicle based on a geographic position of the vehicle and map data and/or historical data and/or statistical data.

Optionally in some examples, including in at least one preferred example, the determination of the target temperature criterion is performed such that a predicted engine out temperature does not exceed a predetermined threshold value throughout the uphill road segment.

Optionally in some examples, including in at least one preferred example, the control of the vehicle during the downhill road segment comprises controlling one or more of an engine power, an engine coupling to a driveline of the vehicle, a gear selection, an exhaust system of the vehicle, an engine braking system, and a service brake.

Optionally in some examples, including in at least one preferred example, the method further comprises:

monitoring, by the processing circuitry, a temperature of the exhaust aftertreatment system during the downhill road segment, and controlling, by the processing circuitry, the engine to be turned off and decoupled from a driveline of the vehicle in response to detecting that the target temperature criterion is met.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
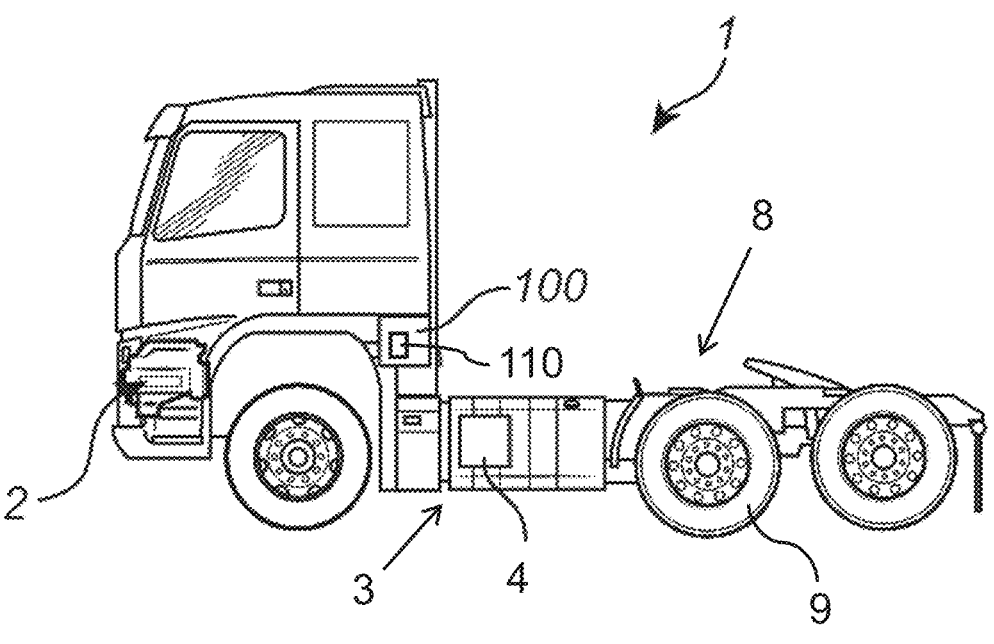
FIG. 1 is an exemplary vehicle according to an example.

A heavy-duty vehicle 1 in the form of a towing truck is schematically illustrated in FIG. 1. The vehicle 1 is driven by an internal combustion engine 2, such as a diesel engine, configured to provide propulsion power to a driveline 8 of the vehicle 1, comprising one or more pairs of driven wheels 9. To reduce emissions in the exhaust gases from the engine 2, an exhaust aftertreatment system (EATS) 3 including a selective catalytic reduction (SCR) unit 4 is provided. The EATS 3 may also comprise other aftertreatment units such as a particulate filter, an oxidation catalyst unit, and a pre-SCR unit. The SCR unit 4 is configured to reduce emissions of nitrogen oxides (NOx) by using a reductant comprising ammonia, $NH_3$. Urea may typically be used as the reductant. For the SCR unit 4 to function optimally and to maintain NOx emissions at an acceptable level, a temperature of the EATS 3 must be kept within optimal boundaries at all times during operation of the vehicle 1. If the EATS temperature is too low or too high, the SCR unit 4 is unable to convert the NOx optimally, which may result in NOx spikes in the emissions from the vehicle 1. Furthermore, at too low temperatures, urea deposits may form in the SCR unit 4, leading to an increased pressure drop over the SCR unit 4 that may increase emissions as well as fuel consumption. At too high temperatures, an $NH_3$ storage capacity within the SCR unit 4 is reduced, which affects the conversion efficiency negatively. The SCR unit 4 may also age more rapidly since, e.g., active catalytic coatings and/or particles may vaporize partly or completely from a substrate of the SCR unit 4.

In hilly terrain, and in particular during uphill climbs, it may however be difficult to keep the temperature of the EATS 3 within the optimal boundaries without negatively affecting fuel consumption of the vehicle 1. For example, if the engine 2 is turned off and decoupled from the driveline 8 at the beginning of a downhill road segment preceding an uphill road segment, and the vehicle is coasted downhill, the temperature of the EATS 3 will remain essentially constant until the engine 2 is turned on again. This may result in the EATS 3 becoming overheated during the uphill climb. Similarly, engine braking with high braking power may lead to a temperature increase of the EATS 3 during the downhill road segment, potentially leading to overheating of the EATS 3 in the uphill climb.

Cooling systems may be used for cooling the EATS 3 during uphill climbs, but such systems tend to increase the fuel consumption of the vehicle 1. Other ways to keep the temperature low include limiting the vehicle speed in the uphill climb and using less fuel-efficient low-NOx modes. The present disclosure instead provides means for proactively controlling the temperature of the EATS 3 to prevent it from becoming too high during uphill climbs. For this purpose, a computer system 100 comprising processing circuitry 110 configured to control the vehicle 1 is provided. Although the computer program 100 is in FIG. 1 illustrated as located on-board the vehicle 1, at least a part of the computer system, such as comprising the processing circuitry 110, may in other embodiments be located remote from the vehicle, such as on a cloud or server and configured to communicate with an on-board control unit.

Figure 2:
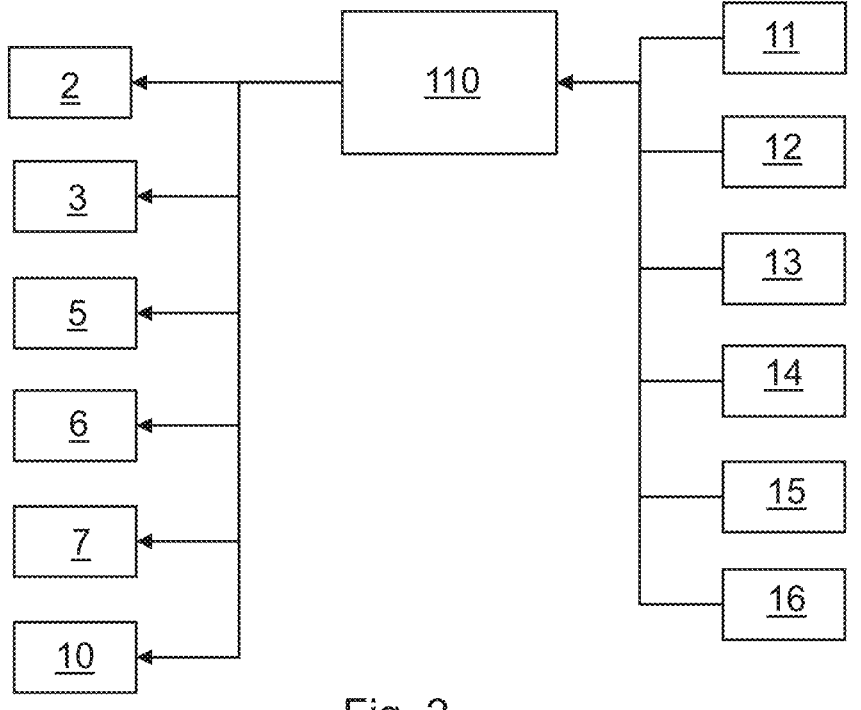
FIG. 2 schematically illustrates a processing circuitry controlling vehicle systems according to an example.

As illustrated in FIG. 2, the processing circuitry 110 may be configured to control various vehicle systems and components including, e.g., the engine 2, the EATS 3, a transmission 5 of the vehicle 1, an exhaust system 6, an engine braking system 7, and a service brake 10 configured to act on wheels of the vehicle 1. The processing circuitry 110 may particularly control those systems and components during downhill travel to meet the target temperature criterion prior to entering the uphill road segment 202. The processing circuitry 110 may, e.g., be configured to control those systems and/or components by sending instructions to specific control units (not shown), such as a transmission control unit, an engine control unit, etc. The processing circuitry 110 may receive input data from various sources, including but not limited to a cruise control 11, one or more temperature sensors 12, a geographic positioning system 13, one or more databases 14 located on-board or off-board the vehicle 1, a vehicle weight sensing system 15, one or more mass flow sensors 16, etc.

Figure 3:
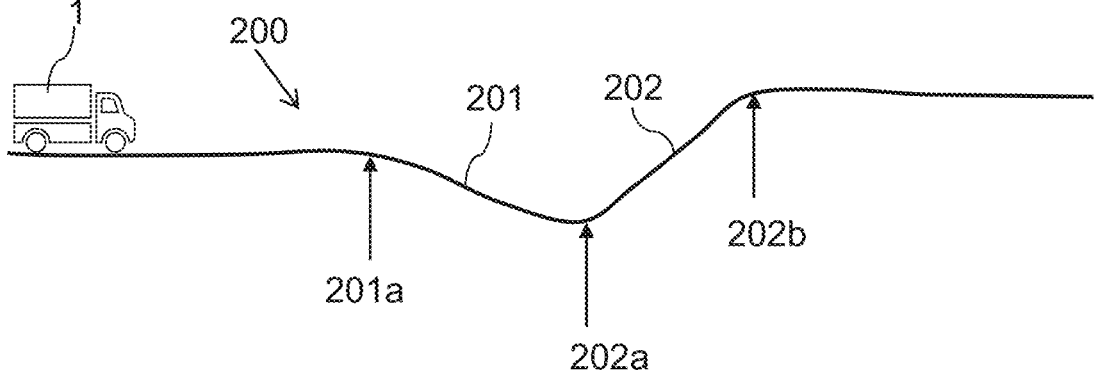
FIG. 3 schematically illustrates a vehicle driving along a travelling route.

FIG. 3 illustrates the vehicle 1 travelling along a travelling route 200 comprising a downhill road segment 201 followed by an uphill road segment 202. The downhill road segment 201 begins at a starting point 201a and the uphill road segment ends at an end point 202b. The processing circuitry 110 of the computer system 100 is configured to predict an engine exhaust condition of the engine 2, wherein the engine exhaust condition is expected to apply while driving the vehicle 1 along the uphill road segment 202. The engine exhaust condition may comprise an engine out temperature and an exhaust mass flow of exhaust gases from the engine 2.

Based om the predicted engine exhaust condition, the processing circuitry 110 is configured to determine a target temperature criterion for the EATS 3 of the vehicle 1. It is further configured to control the vehicle 1 during the downhill road segment 201 such that a temperature of the EATS 3 meets the target temperature criterion at a beginning 202a of the uphill road segment 202.

The target temperature criterion may, e.g., be considered met if the exhaust gas temperature, as measured within the EATS 3, is at a target temperature value or within a target temperature range at the beginning 202a of the uphill road segment 202. The target temperature criterion, i.e., the target temperature value or target temperature range, may be set by taking an expected temperature increase of the EATS 3 during the uphill road segment 202 into account, as well as a known upper temperature level for efficient NOx reduction within the SCR unit 4 of the EATS 3. The target temperature criterion may be determined, e.g., by the processing circuitry 110, such that a predicted engine out temperature does not exceed a predetermined threshold value throughout the uphill road segment 202. In particular, the target temperature criterion may be set such that the temperature of the EATS 3 remains below an upper temperature level for efficient NOx reduction throughout the entire uphill road segment 202, and such that the temperature of the EATS 3 at the beginning 202a of the uphill road segment 202 does not fall below a lower temperature level for efficient NOx reduction.

The travelling route 200 is an expected travelling route of the vehicle 1, which may be expected, e.g., based on a geographic position of the vehicle 1 as determined and communicated by the geographic positioning system, and map data. The geographic position may herein include a geographic location and a heading of the vehicle 1. The expected travelling route 200 may further be determined based on the current geographic position of the vehicle in combination with historical data relating to previous travel of the vehicle 1 and/or statistical data relating to previous travel of other vehicles, such as other vehicles in the same vehicle fleet. The expected travelling route 200 may be a programmed predetermined route of the vehicle 1. The processing circuitry 110 may be configured to determine a length and an inclination of the uphill road segment 202 by predicting a road topography along the expected travelling route 200 of the vehicle 1 based on the geographic position of the vehicle 1 and map data and/or historical data and/or statistical data as described above.

The processing circuitry 110 may be configured to predict the engine exhaust condition based on the length and the inclination of the uphill road segment 202, and further based on a set of vehicle parameters including at least a current vehicle weight and an expected vehicle speed of the vehicle 1 along the uphill road segment 202. The inclination as well as the vehicle speed may vary along the uphill road segment 202 and the variations may be taken into account in the prediction. The processing circuitry 110 may, e.g., determine the set of vehicle parameters used in the prediction of the engine exhaust condition by receiving data relating thereto. It may, e.g., use a stored value of the vehicle weight, such as a last stored value, and/or it may be configured to monitor the vehicle weight and determine a current value of the vehicle weight. It may, e.g., be configured to predict the expected vehicle speed along the uphill road segment 202 based on input data received from a cruise control 11 of the vehicle 1, such as data relating to a set speed of the vehicle 1, e.g., a set speed value.

The set of vehicle parameters used by the processing circuitry 110 to predict the engine exhaust condition may further include one or more of: a time constant of the exhaust aftertreatment system 3, an ambient temperature of the vehicle 1 at a current vehicle location, a roll resistance felt by the vehicle 1, and/or an air resistance felt by the vehicle 1. The time constant of the exhaust aftertreatment system determines how fast the temperature of the exhaust aftertreatment system will change as the temperature of the incoming exhaust gases changes. The processing circuitry 110 may use a known value of the time constant, such as a preset value or a value received from a database 14 or similar. The processing circuitry 110 may be configured to calculate the roll resistance and/or the air resistance expected to be felt by the vehicle 1 during the uphill road segment 202 based on a known vehicle configuration and the expected vehicle speed. The processing circuitry 110 may further be configured to receive data relating to those parameters from a database 14. The processing circuitry 110 may be configured to monitor the ambient temperature of the vehicle, such as by receiving temperature data from a temperature sensor 12 of the vehicle 1, or from a temperature sensor located off-board the vehicle 1.

During the downhill road segment 201, the processing circuitry 110 may be configured to control the vehicle 1 by controlling one or more of an engine power, an engine coupling to a driveline 8 of the vehicle 1, a gear selection, an exhaust system 6 of the vehicle 1, an engine braking system 7, and a service brake 10 of the vehicle. There may in most cases be several different ways to control the vehicle 1 to reach the target temperature criterion during the downhill road segment 201, and hence a suitable strategy may be selected by taking other factors into consideration, such as fuel consumption, braking performance, brake wear, emission levels, etc.

Engine power: The processing circuitry 110 may be configured to control the engine 2 to be on or off. If the engine 2 is turned on, it may be configured to control the engine power to a lower value to reduce the exhaust gas temperature.

Engine coupling to the driveline: The processing circuitry 110 may be configured to control a mechanical connection between the engine 2 and the driveline 8, such as a clutch or a gear selecting device of the transmission 5, with the engine 1 turned on or off. For example, the vehicle 1 may be controlled to coast during at least a part of the downhill road segment 201, hence coupling the engine 2 to the driveline 8 without injecting any fuel, leading to a temperature reduction due to air flowing through the exhaust system. By controlling the engine 2 to be turned off and decoupled from the driveline 8, the exhaust gas temperature is likely to remain constant or essentially constant during a time frame representative of most downhill road segments.

Gear selection: The processing circuitry 110 may be configured to control the transmission 5 of the vehicle 1 to select a desired gear. Selection of a higher gear ratio during the downhill road segment 201 will generally result in a reduction of the exhaust gas temperature in comparison with selection of a lower gear ratio.

Exhaust system: The processing circuitry 110 may be configured to control various valves of the exhaust system 6. For example, when the exhaust system comprises an exhaust gas recirculation (EGR) circuit, an EGR valve may be used to control the amount of exhaust gases recirculated to the engine 2, wherein generally a larger amount of recirculated exhaust gases will lead to a reduced exhaust gas temperature.

Engine braking system: When an engine braking system 7 in the form of a compression braking system is provided, the processing circuitry 110 may be configured to control the engine braking power of the engine braking system 7, e.g., by reducing the engine braking power to reduce the exhaust gas temperature.

Service brake: The processing circuitry 110 may be configured to control the service brake 10 of the vehicle 1 in addition to the engine braking system 7, e.g., to increase the braking power of the service brake 10 relative to the engine braking power to thereby reduce the exhaust gas temperature. The amount of braking power that is exerted by the service brake 10 may, e.g., be controlled depending on brake constraints, requested braking performance, brake wear, etc.

The processing circuitry 110 may be configured to monitor the temperature of the EATS 3 during the downhill road segment 201 to determine if the target temperature criterion is met. If it detects that the target temperature criterion is met before the vehicle 1 reaches the beginning 202a of the uphill road segment 202, it may be configured to control the engine 2 to be turned off and decoupled from the driveline.

Figure 4:
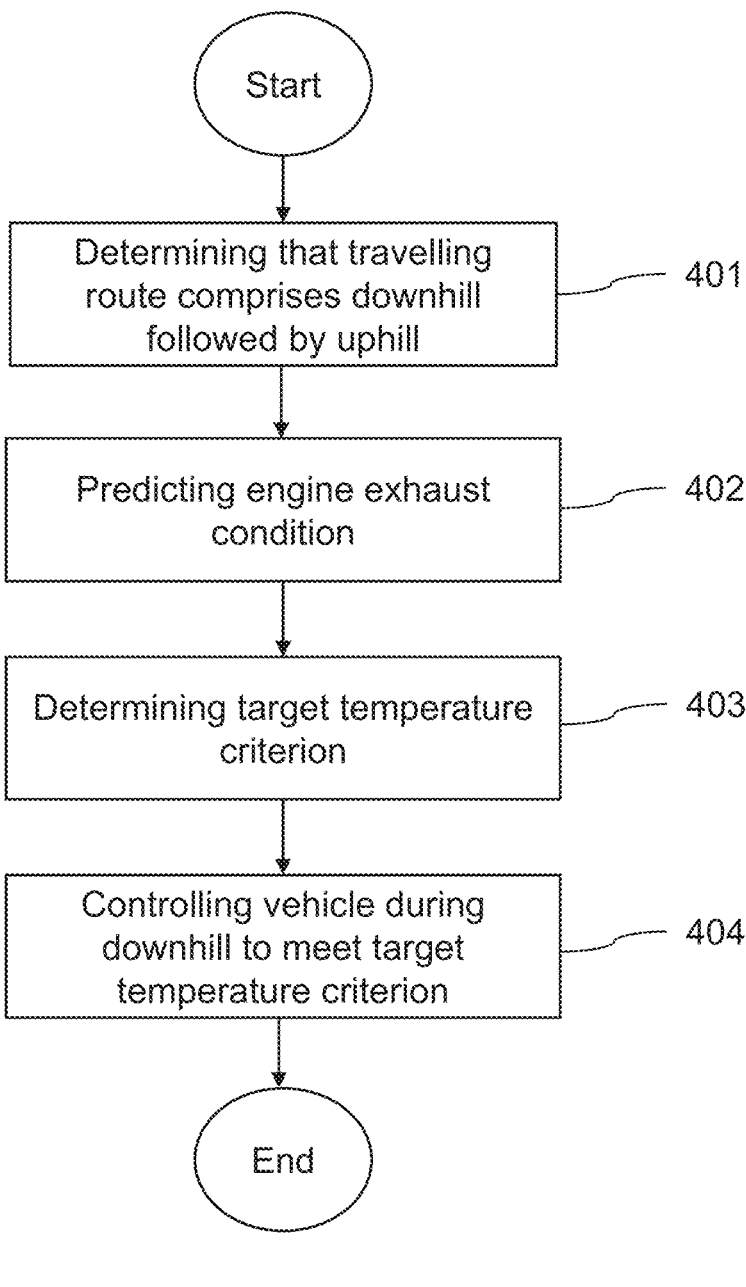
FIG. 4 is a flow chart illustrating a method according to an example of the disclosure.

FIG. 4 schematically illustrates a method according to an example of the present disclosure. The method comprises the following actions:

Action 401: Determining, by the processing circuitry 110 of the computer system 100, that the expected travelling route 200 of the vehicle 1 comprises a downhill road segment 201 followed by an uphill road segment 202.

Action 402: Predicting, by the processing circuitry 110, the engine exhaust condition of the engine 2 of the vehicle 1, wherein the engine exhaust condition is expected to apply while driving the vehicle 1 along the uphill road segment 202.

Action 403: Determining, by the processing circuitry 110, a target temperature criterion for the EATS 3 of the vehicle 1 based on the predicted engine exhaust condition.

Action 404: Controlling, by the processing circuitry 110, the vehicle 1 during the downhill road segment 201 such that a temperature of the exhaust aftertreatment system 3 meets the target temperature criterion at a beginning 202a of the uphill road segment 202.

Figure 5A:
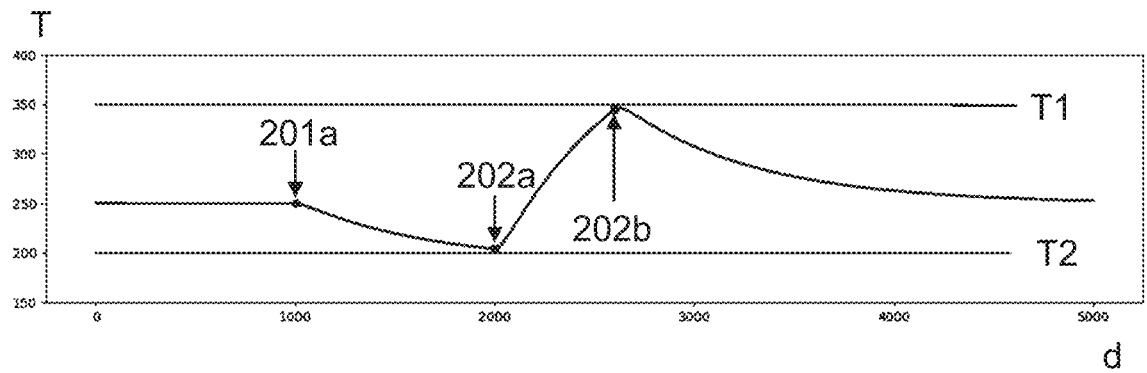
FIGS. 5A and 5B are examples of EATS temperature over time as the vehicle travels along the travelling route.
Figure 5B:
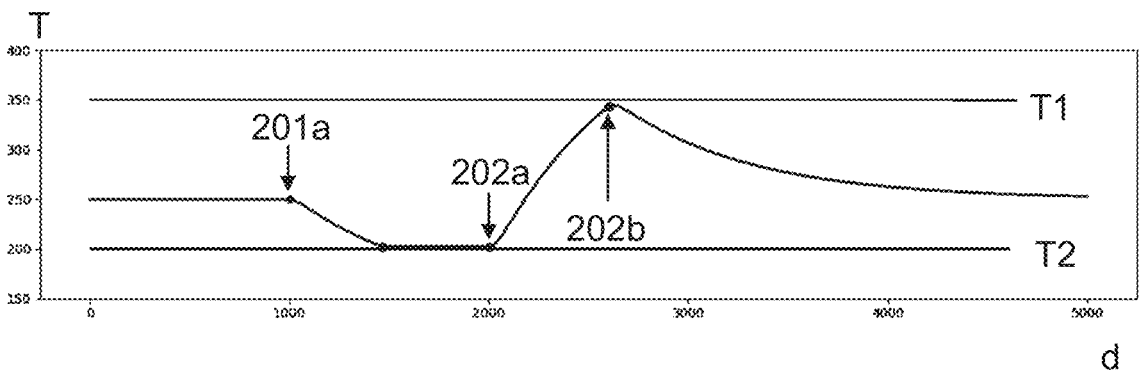

FIG. 5A and FIG. 5B illustrate, for two different driving scenarios, temperature T of the EATS 3 as a function of distance d travelled by the vehicle 1 along the travelling route 200 illustrated in FIG. 3. In both scenarios, an upper temperature level T1 and a lower temperature level T2 are defined, between which it is desirable to keep the temperature of the EATS 3 to ensure proper function of the SCR unit 4. In both driving scenarios, the processing circuitry 110 determines, in the action 401, that the expected travelling route 200 comprises the downhill road segment 201 and the uphill road segment 202. It determines the length and inclination of the uphill road segment 202 as well as the required set of vehicle parameters as described above. Based thereon, it predicts, in the action 402, the engine exhaust condition expected to apply during the uphill road segment 202. It further determines, in the action 403, a target temperature criterion that should be met at the beginning 202a of the uphill road segment 202 in order for the temperature to remain below the upper temperature level T1 throughout the uphill road segment 202. The target temperature criterion may be a target temperature value or a target temperature range. In the illustrated examples, the target temperature value is set to coincide with the lower temperature level T2, hence allowing maximum temperature increase in the uphill climb.

In the first driving scenario illustrated in FIG. 5A, the processing circuitry 110, in the action 404, controls the vehicle 1 during the downhill road segment 201 such that the target temperature value is reached at the beginning 202a of the uphill road segment 202. This may be achieved in any one of the ways described above.

In the second driving scenario illustrated in FIG. 5B, the processing circuitry 110, in the action 404, controls the vehicle 1 during the downhill road segment 201 such that the target temperature value is reached prior to the beginning 202a of the uphill road segment 202. The processing circuitry 110 monitors the temperature of the EATS 3 during the downhill road segment 201, e.g. via one or more temperature sensors provided in the EATS 3. As soon as it detects that the target temperature criterion is met, i.e., that the lower temperature level T2 is reached, it controls the engine 2 to turn off and decouples it from the driveline 8, such as by controlling the transmission 5 to engage a neutral gear or by operating a clutch. The temperature of the EATS 3 remains constant or essentially constant until the beginning 202a of the uphill road segment 202 is reached.

Figure 6:
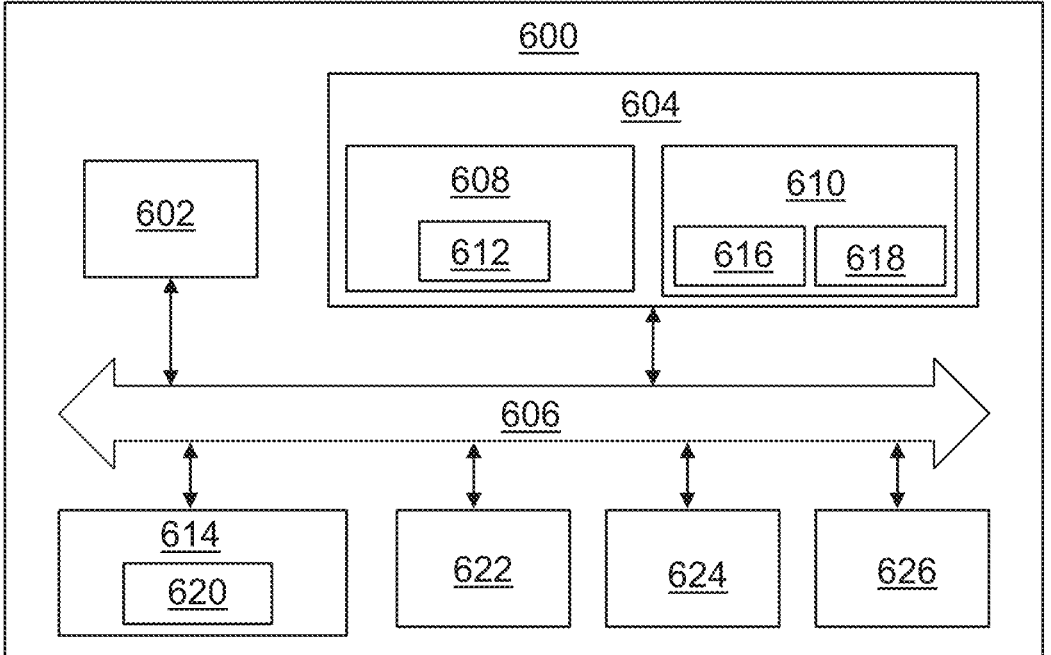
FIG. 6 is a schematic diagram of an exemplary computer system for implementing examples disclosed herein, according to an example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures.

The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The following is a list of numbered examples of aspects of the present disclosure.

Example 1. A computer system (100) comprising processing circuitry (110) configured to control a vehicle (1), the processing circuitry being configured to:

determine that an expected travelling route (200) of the vehicle (1) comprises a downhill road segment (201) followed by an uphill road segment (202), predict an engine exhaust condition of an engine (2) of the vehicle, wherein the engine exhaust condition is expected to apply while driving the vehicle (1) along the uphill road segment (202), determine a target temperature criterion for an exhaust aftertreatment system (3) of the vehicle (1) based on the predicted engine exhaust condition, control the vehicle during the downhill road segment (201) such that a temperature of the exhaust aftertreatment system (3) meets the target temperature criterion at a beginning (202a) of the uphill road segment (202).

Example 2. The computer system of example 1, wherein the engine exhaust condition comprises an engine out temperature and an exhaust mass flow of exhaust gases from the engine (2).

Example 3. The computer system of example 2, wherein the processing circuitry is configured to predict the engine exhaust condition based on a length and an inclination of the uphill road segment (202), and further based on a set of vehicle parameters including at least a current vehicle weight and an expected vehicle speed of the vehicle (1) along the uphill road segment (202).

Example 4. The computer system of example 3, wherein the processing circuitry is configured to predict the expected vehicle speed of the vehicle (1) along the uphill road segment (202) based on input data received from a cruise control (11) of the vehicle (1), and/or wherein the processing circuitry is configured to monitor the vehicle weight to determine the current vehicle weight.

Example 5. The computer system of example 3 or 4, wherein the set of vehicle parameters used by the processing circuitry to predict the engine exhaust condition further includes one or more of: a time constant of the exhaust aftertreatment system (3), an ambient temperature of the vehicle (1) at a current vehicle location, a roll resistance felt by the vehicle (1), and/or an air resistance felt by the vehicle (1).

Example 6. The computer system of any one of examples 3-5, wherein the processing circuitry is configured to determine the length and the inclination of the uphill road segment (202) by:

predicting a road topography along the expected travelling route (200) of the vehicle (1) based on a geographic position of the vehicle (1) and map data and/or historical data and/or statistical data.

Example 7. The computer system of any one of the preceding examples, wherein the processing circuitry is configured to determine the target temperature criterion such that a predicted engine out temperature does not exceed a predetermined threshold value throughout the uphill road segment (202).

Example 8. The computer system according to any one of the preceding examples, wherein the control of the vehicle (1) during the downhill road segment (201) comprises control of one or more of an engine power, an engine coupling to a driveline of the vehicle (1), a gear selection, an exhaust system (6) of the vehicle (1), an engine braking system (7), and a service brake (10).

Example 9. The computer system according to any one of the preceding examples, wherein the processing circuitry is configured to monitor a temperature of the exhaust aftertreatment system (3) during the downhill road segment (201), and to control the engine (2) to be turned off and decoupled from a driveline of the vehicle (1) in response to detecting that the target temperature criterion is met.

Example 10. A vehicle (1) comprising the computer system (100) of any of examples 1-9.

Example 11. A computer-implemented method for controlling a vehicle (1), the method comprising:

determining (401), by processing circuitry of a computer system (100), that an expected travelling route (200) of a vehicle (1) comprises a downhill road segment (201) followed by an uphill road segment (202), predicting (402), by the processing circuitry, an engine exhaust condition of an engine (2) of the vehicle (1), wherein the engine exhaust condition is expected to apply while driving the vehicle (1) along the uphill road segment, determining (403), by the processing circuitry, a target temperature criterion for an exhaust aftertreatment system (3) of the vehicle (1) based on the predicted engine exhaust condition, controlling (404), by the processing circuitry, the vehicle (1) during the downhill road segment (201) such that a temperature of the exhaust aftertreatment system (3) meets the target temperature criterion at a beginning (202a) of the uphill road segment (202).

Example 12. The method of example 11, wherein the engine exhaust condition comprises an engine out temperature and an exhaust mass flow of exhaust gases from the engine (2).

Example 13. The method of example 12, wherein the prediction of the engine exhaust condition is performed based on a length and an inclination of the uphill road segment (202), and further based on a set of vehicle parameters including at least a current vehicle weight and an expected vehicle speed of the vehicle (1) along the uphill road segment (202).

Example 14. The method of example 13, further comprising:

predicting, by the processing circuitry, the expected vehicle speed of the vehicle (1) along the uphill road segment (202) based on input data received from a cruise control (11) of the vehicle (1), and/or monitoring, by the processing circuitry, the vehicle weight to determine the current vehicle weight.

Example 15. The method of example 13 or 14, wherein the set of vehicle parameters used in the prediction of the engine exhaust condition further includes one or more of: a time constant of the exhaust aftertreatment system (3), an ambient temperature of the vehicle (1) at a current vehicle location, a roll resistance felt by the vehicle (1), and/or an air resistance felt by the vehicle (1).

Example 16. The method of any one of examples 13-15, wherein the determination of the length and the inclination of the uphill road segment (202) comprises:

predicting a road topography along the expected travelling route (200) of the vehicle (1) based on a geographic position of the vehicle (1) and map data and/or historical data and/or statistical data.

Example 17. The method of any one of examples 11-16, wherein the determination of the target temperature criterion is performed such that a predicted engine out temperature does not exceed a predetermined threshold value throughout the uphill road segment (202).

Example 18. The method of any one of examples 11-17, wherein the control of the vehicle (1) during the downhill road segment (201) comprises controlling one or more of an engine power, an engine coupling to a driveline (8) of the vehicle (1), a gear selection, an exhaust system of the vehicle, an engine braking system (7), and a service brake (10).

Example 19. The method of any one of examples 11-18, further comprising:

monitoring, by the processing circuitry, a temperature of the exhaust aftertreatment system (3) during the downhill road segment (201), and controlling, by the processing circuitry, the engine (2) to be turned off and decoupled from a driveline of the vehicle (1) in response to detecting that the target temperature criterion is met.

Example 20. A computer program product comprising program code for performing, when executed by the processing circuitry, the method of any of examples 11-19.

Example 21. A non-transitory computer-readable storage medium comprising instructions, which when executed by the processing circuitry, cause the processing circuitry to perform the method of any of examples 11-19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to control a vehicle, the processing circuitry being configured to:

determine that an expected travelling route of the vehicle comprises a downhill road segment followed by an uphill road segment;

predict an engine exhaust condition of an engine of the vehicle, wherein the engine exhaust condition is expected to apply while driving the vehicle along the uphill road segment;

determine a target temperature criterion for an exhaust aftertreatment system of the vehicle based on the predicted engine exhaust condition; and control the vehicle during the downhill road segment such that a temperature of the exhaust aftertreatment system meets the target temperature criterion at a beginning of the uphill road segment;

monitor a temperature of the exhaust aftertreatment system during the downhill road segment; and control the engine to be turned off and decoupled from a driveline of the vehicle in response to detecting that the target temperature criterion is met.

2. The computer system of claim 1, wherein the engine exhaust condition comprises an engine out temperature and an exhaust mass flow of exhaust gases from the engine.

3. The computer system of claim 2, wherein the processing circuitry is further configured to predict the engine exhaust condition based on a length and an inclination of the uphill road segment, and further based on a set of vehicle parameters including at least a current vehicle weight and an expected vehicle speed of the vehicle along the uphill road segment.

4. The computer system of claim 3, wherein the processing circuitry is further configured to at least one of:

predict the expected vehicle speed of the vehicle along the uphill road segment based on input data received from a cruise control of the vehicle; and monitor the vehicle weight to determine the current vehicle weight.

5. The computer system of claim 3, wherein the set of vehicle parameters used by the processing circuitry to predict the engine exhaust condition further includes at least one of: a time constant of the exhaust aftertreatment system, an ambient temperature of the vehicle at a current vehicle location, a roll resistance felt by the vehicle, and an air resistance felt by the vehicle.

6. The computer system of claim 3, wherein the processing circuitry is further configured to determine the length and the inclination of the uphill road segment by:

predicting a road topography along the expected travelling route of the vehicle based on at least one of a geographic position of the vehicle and map data, historical data, and statistical data.

7. The computer system of claim 1, wherein the processing circuitry is further configured to determine the target temperature criterion such that a predicted engine out temperature does not exceed a predetermined threshold value throughout the uphill road segment.

8. The computer system of claim 1, wherein the control of the vehicle during the downhill road segment comprises control of at least one of an engine power, an engine coupling to a driveline of the vehicle, a gear selection, an exhaust system of the vehicle, an engine braking system, and a service brake.

9. A vehicle comprising a computer system comprising processing circuitry configured to control a vehicle, the processing circuitry being configured to:

determine that an expected travelling route of the vehicle comprises a downhill road segment followed by an uphill road segment;

predict an engine exhaust condition of an engine of the vehicle, wherein the engine exhaust condition is expected to apply while driving the vehicle along the uphill road segment;

determine a target temperature criterion for an exhaust aftertreatment system of the vehicle based on the predicted engine exhaust condition;

control the vehicle during the downhill road segment such that a temperature of the exhaust aftertreatment system meets the target temperature criterion at a beginning of the uphill road segment;

monitor a temperature of the exhaust aftertreatment system during the downhill road segment; and control the engine to be turned off and decoupled from a driveline of the vehicle in response to detecting that the target temperature criterion is met.

10. A computer-implemented method for controlling a vehicle, the method comprising:

determining, by processing circuitry of a computer system, that an expected travelling route of a vehicle comprises a downhill road segment followed by an uphill road segment;

predicting, by the processing circuitry, an engine exhaust condition of an engine of the vehicle, wherein the engine exhaust condition is expected to apply while driving the vehicle along the uphill road segment;

determining, by the processing circuitry, a target temperature criterion for an exhaust aftertreatment system of the vehicle based on the predicted engine exhaust condition;

controlling, by the processing circuitry, the vehicle during the downhill road segment such that a temperature of the exhaust aftertreatment system meets the target temperature criterion at a beginning of the uphill road segment;

monitoring a temperature of the exhaust aftertreatment system during the downhill road segment; and controlling the engine to be turned off and decoupled from a driveline of the vehicle in response to detecting that the target temperature criterion is met.

11. The method of claim 10, wherein the engine exhaust condition comprises an engine out temperature and an exhaust mass flow of exhaust gases from the engine.

12. The method of claim 11, wherein the prediction of the engine exhaust condition is performed based on a length and an inclination of the uphill road segment, and further based on a set of vehicle parameters including at least a current vehicle weight and an expected vehicle speed of the vehicle along the uphill road segment.

13. The method of claim 12, further comprising at least one of:

predicting, by the processing circuitry, the expected vehicle speed of the vehicle along the uphill road segment based on input data received from a cruise control of the vehicle; and monitoring, by the processing circuitry, the vehicle weight to determine the current vehicle weight.

14. The method of claim 12, wherein the set of vehicle parameters used in the prediction of the engine exhaust condition further includes at least one of: a time constant of the exhaust aftertreatment system, an ambient temperature of the vehicle at a current vehicle location, a roll resistance felt by the vehicle, and an air resistance felt by the vehicle.

15. The method of claim 12, wherein the determination of the length and the inclination of the uphill road segment comprises:

predicting a road topography along the expected travelling route of the vehicle based on at least one of a geographic position of the vehicle and map data, historical data, and statistical data.

16. The method of claim 10, wherein the determination of the target temperature criterion is performed such that a predicted engine out temperature does not exceed a predetermined threshold value throughout the uphill road segment.

17. The method of claim 10, wherein the control of the vehicle during the downhill road segment comprises controlling at least one of an engine power, an engine coupling to the driveline of the vehicle, a gear selection, an exhaust system of the vehicle, an engine braking system, and a service brake.

18. A computer program product comprising program code for performing, when executed by the processing circuitry, the method of claim 10.

19. A non-transitory computer-readable storage medium comprising instructions, which when executed by the processing circuitry, cause the processing circuitry to perform the method of claim 10.

* * * * *